US006271291B1

(12) United States Patent
McWilliams et al.

(10) Patent No.: US 6,271,291 B1
(45) Date of Patent: Aug. 7, 2001

(54) EXTRUDABLE MASTERBATCH

(75) Inventors: Douglas Stephens McWilliams; Harold Eugene Dobbs, both of Kingsport, TN (US); Scott Arnold Hanson, Longview, TX (US); Emily Tedrow Bell, East Longmeadow, MA (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/454,792

(22) Filed: Dec. 3, 1999

Related U.S. Application Data

(60) Provisional application No. 60/112,907, filed on Dec. 18, 1998.

(51) Int. Cl.[7] .................................................. C08K 5/33
(52) U.S. Cl. .................................................. 524/236
(58) Field of Search ................................ 524/236

(56) References Cited

U.S. PATENT DOCUMENTS

| 2,465,319 | 3/1949 | Whinfield et al. |
| 3,047,539 | 7/1962 | Pengilly . |
| 4,086,212 | * 4/1978 | Bier et al. .................... 260/75 R |
| 4,904,825 | 2/1990 | Govindan . |
| 5,053,531 | 10/1991 | Govindan . |
| 5,187,214 | 2/1993 | Govindan . |

FOREIGN PATENT DOCUMENTS

| 2146715 | 10/1995 | (CA) . |
| 0402484 | 12/1990 | (EP) . |
| 3277627 | 12/1991 | (JP) . |
| 06011904 | 1/1994 | (JP) . |
| 06329772 | 11/1994 | (JP) . |
| WO9718253 | 5/1997 | (WO) . |

OTHER PUBLICATIONS

Database WPI; AN 1972–42448T XP 002135186 & JP 470231878 (Unitika Ltd.).

* cited by examiner

*Primary Examiner*—Edward J. Cain
(74) *Attorney, Agent, or Firm*—Cheryl J. Tubach, Esq.; Bernard J. Graves, Jr. Esq.

(57) ABSTRACT

A novel composition is provided comprising a copolyester having CHDM moieties in amounts of about 1 to about 20 mole percent, and a particular antistat, that is extrudable.

20 Claims, No Drawings

EXTRUDABLE MASTERBATCH

CROSS-REFERENCE TO RELATED APPLICATIONS

This application claims priority upon provisional application Serial No. 60/112,907 filed Dec. 18, 1998 and the 60/11907, filed is herein incorporated by this reference in its entirety.

FIELD OF THE INVENTION

This invention is concerned with masterbatches of selected antistatic agents in certain copolyesters based on terephthalic acid, naphthalenedicarboxylic acid, and/or 1,4-cyclohexanedicarboxylic acid and on the blending of these masterbatches with the same or other homo- or copolyesters to provide films, sheeting, and thermoformed articles having antistatic properties. Specifically, antistat additives for certain copolyesters are disclosed which provide the required antistat performance in the final film, sheet, or molded article. However, these additives cause feeding problems during extrusion processing for some preferred copolyester compositions.

BACKGROUND OF THE INVENTION

Polyesters are widely used as extrusion and injection molding resins for applications such as fibers, films, sheeting, food and beverage containers and the like. Commonly used polyesters include polyethylene terephthalate (PET), poly-1,4-butylene terephthalate (PBT), and poly-1,4-cyclohexanedimethylene terephthalate (PCT). Copolyesters are frequently used when special properties such as lower processing temperatures, clarity, or inhibited crystallization are needed. Polyesters like most other synthetic polymers are poor conductors of electricity. Thus, during extrusion, processing, or handling of such polymers, static charges may accumulate. This is especially true under conditions of low relative humidity. Static charge is highly undesirable in that it can cause material handling problems during processing, lead to shocks when molded parts are handled, lead to the collection of dust on packages, and cause damage to sensitive electronic parts that are stored in plastic packaging due to dissipation of static charge. Therefore, it would be advantageous if thermoplastic polyesters could be provided which had good antistatic properties.

There are many antistat additives available for use in thermoplastic polymers including polyesters. Often these additives are blended with the same or other thermoplastic polymer in higher concentration to form a masterbatch that is subsequently let down for film or sheet extrusion or injection molding. In addition, some antistat additives can cause processing problems such as poor feeding during extrusion that can prohibit their use.

SUMMARY OF THE INVENTION

In accordance with this invention, there are provided masterbatch compositions comprising certain antistat agents and copolyesters containing 1,4-cydohexanedimethanol (CHDM) that are extrudable, and as such allow use of the antistat additives in producing the required antistat performance in the final film, sheet or molded artide prepared therefrom. The amount of antistatic agent utilized is from about greater than 1.6 weight percent to about 10 weight percent based on the total composition.

A preferred copolyester utilized is based on terephthalic acid, naphthalenedicarboxylic acid, and/or 1,4-cyclohexanedicarboxylic acid, and contains from about 80 to about 99 mole percent ethylene glycol and about 1 to about 20 mole percent of a modifying diol, preferably CHDM. It has been found unexpectedly that masterbatch compositions comprising the specified antistat additive and a copolyester as described above having ethylene glycol in an amount less than 80 mole percent are not satisfactory since such masterbatch compositions are not extrudable.

The antistatic agents are quatemary ammonium salts having thermal stability at temperatures greater than 200° C. Thermal stability is weight loss of less than 5 weight percent when heated to temperatures up to about 275° C. Exemplary are quatemary ammonium alkyl benzene sulfonate salts, quaternary ammonium alkane sulfonate salts, and the like. Specific examples include octyl dimethyl hydroxyethyl ammonium dodecylbenzene sulfonate and octyl dimethyl hydroxyethyl ammonium methane sulfonate. Other compounds of this type are listed in U.S. Pat. Nos. 4,904,825, 5,053,531 and 5,187,214. Some of these materials are available commercially from BASF Corporation. The resulting masterbatch compositions may be blended with the same or different homo- or copolyesters to provide films, sheeting and thermoformed articles having antistatic properties.

DETAILED DESCRIPTION OF THE INVENTION

The novel masterbatch compositions of the present invention comprise a copolyester comprising terephthalic acid, naphthalenedicarboxylic acid, and/or 1,4-cyclohexanedicarboxylic acid, or mixtures thereof, from about 80 to about 99 mole percent ethylene glycol and about 1 to about 20 mole percent of a modifying diol, preferably CHDM; and an antistatic agent. The antistatic agent is present in an amount of from about greater than 1.6 to about 10 weight percent, based on the final composition. Preferably the antistat is present in amounts of from about 3 to about 7 weight based on the total composition.

Useful polyesters in the practice of this invention include terephthalate, naphthalenedicarboxylate and 1,4-cyclohexanedicarboxylate copolyesters, preferably containing ethylene glycol and 1,4-cyclohexanedimethanol (CHDM) moieties. The modifying diol concentrations will generally range from about 1 to about 20 mole percent The copolyesters will generally contain at least about 80 mole percent of terephthalic, naphthalenedicarboxylic, or 1,4-cyclohexanedicarboxylic acid moieties. Mixtures of the acids may be used if desired.

About 1 to about 20 mole percent of modifying acids and/or glycols may be used. Exemplary modifying acid components (aliphatic, alicyclic, or aromatic dicarboxylic acids) of the linear copolyester are selected, for example, from isophthalic acid, 1,3-cyclohexanedicarboxylic acid, succinic acid, glutaric acid, adipic acid, sebacic acid, suberic acid, 1,12-dodecanedioic acid, and the like. In polymer preparation, it is often preferable to use a functional acid derivative thereof such as the dimethyl, diethyl, or dipropyl ester of the dicarboxylic acid. The anhydrides or acid halides of these acids also may be employed where practical.

Exemplary modifying diol components of the described copolyesters may be selected from neopentyl glycol, 1,4cyclohexanedimethanol, 1,2-propanediol, 1,3propanediol, 1,4butanediol, 1,6-hexanediol, 1,2-cyclohexanediol, 1,4-cyclohexanediol, 1,2-cyclohexanedimethanol, 1,3-cyclohexanedimethanol, Z,8-bis(hydroxymethyl)-tricyclo-[5.2.1.0]-decane wherein Z represents 3, 4, or 5; and diols containing one or more oxygen atoms in the chain, e.g. diethylene glycol, triethylene glycol, dipropylene glycol, tripropylene glycol, and the like. In general, these diols contain 2 to 18, preferably 2 to 8 carbon atoms. Cycloaliphatic diols can be employed in their cis or trans configuration or as mixtures of both forms. 1,4-cyclohexanedimethanol is the preferred modifying diol.

It is preferred that the modifying diol is present at from about 1–15 mole %, preferably, 5–15 mole %, and more preferably, 10–14 mole %.

A particularly preferred embodiment of the copolyester comprises 100 mole % terephthalic acid, about 80–99 mole percent ethylene glycol and about 1 to 20 mole % 1,4-cyclohexanedimethanol.

Another particularly preferred embodiment of the copolyester comprises 100 mole % terephthalic acid, about 80–90 mole percent ethylene glycol and about 10 to 20 mole % 1,4-cyclohexanedimethanol.

The mole percentages of the diol component of copolyester of the invention total 100 mole %. The mole percentages of the acid component of the copolyester of the invention total 100 mole %.

Small amounts of branching agents such as trimellitc acid, pyromellitic dianhydride, trimethylolpropane, pentaerythritol, and the like may be used. Generally less than about 2 mole percent of such agents is used.

The CHDM and 1,4-cydohexanedicarboxylic components may be in the cis form, the trans form, or a mixture of cis and trans isomers. The acid moiety may be derived from the acid or a suitable synthetic equivalent such as a lower alkyl ester. The dimethyl esters are widely used to make polyesters. The naphthalenedicarboxylate moiety will generally be derived from 2,6-naphthalenedicarboxylic acid or its lower alkyl esters containing 1 to 4 carbon atoms. However, other naphthalenedicarboxylic acid isomers or mixtures of isomers may be used if desired. The preferred isomers are the 2,6-, 2,7-, 1,4- and 1,5-isomers.

Preferred copolyesters for use herein comprise about 100 mole percent terephthalic acid, about 80 to about 99 mole percent ethylene glycol, and about 1 to about 20 mole percent CHDM.

The polyesters of this invention are well known and many of them are commercially available from Eastman Chemical Company. Methods for their preparation are described in U.S. Pat. Nos. 2,465,319 and 3,047,539. Useful copolyesters will have inherent viscosity values (I.V.) of about 0.5 dL/g to about 1.5 dL/g, but those with values of about 0.6 dL/g to about 1.0 dL/g are preferred. Inherent viscosity is determined in a 60/40 (wt/wt) phenol/tetrachloroethane solution at a concentration of 0.5 grams per 100 ml at 25° C.

The antistatic agents of the masterbatch compositions are quaternary ammonium salts having thermal stability at temperatures greater than 200° C. Thermal stability is weight loss of less than 5 weight percent when heated to temperatures up to about 275° C. Exemplary are quaternary ammonium alkyl benzene sulfonate salts, quaternary ammonium alkane sulfonate salts, and the like. Specific examples include octyl dimethyl hydroxyethyl ammonium dodecylbenzene sulfonate and octyl dimethyl hydroxyethyl ammonium methane sulfonate. Other compounds of this type are listed in U.S. Pat. Nos. 4,904,825, 5,053,531 and 5,187,214.

Further exemplary of the antistatic agents suitable for use herein are represented by the following formula:

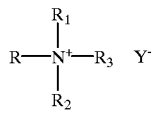

wherein R is a $C_2$–$C_{22}$ alkyl, preferably a $C_8$–$C_{18}$ alkyl, and $R_1$ is selected from the group consisting of $C_1$–$C_{22}$ alkyl and an alkyleneoxy radical, "Z" that may be represented by the formula, [—$CH_2$—C(A)H—O]$_x$H, wherein A is hydrogen, methyl or ethyl, and x is an integer of from 1–5, e.g. hydroxyethyl, hydroxypropyl, hydroxybutyl, poly (ethyleneoxy) hydroxyethyl, poly(propyleneoxy) 2-hydroxypropyl, and poly(butyleneoxy) 2-hydroxybutyl. Preferably $R_1$ is selected from the group consisting Of $C_1$–$C_3$ alkyl or $C_8$–$C_{18}$ alkyl, e.g. methyl, ethyl, n-propyl, isopropyl, octyl, decyl, dodecyl, hexadecyl, and octadecyl, or the alkyleneoxy radical Z wherein A is hydrogen or methyl and x is 1 to 3. Still more preferably, $R_1$ s a $C_1$–$C_3$ alkyl or alkylenenoxy radical Z wherein A is hydrogen and x is 1 to 2. When x is greater than 1, the sulfonate compound may be liquid, which makes it easier to handle.

$R_2$ in the above formula is selected from the group consisting of $C_1$–$C_3$ alkyl, e.g. Methyl, ethyl, n-propyl and isopropyl, and the radical Z, wherein A and x are as defined with respect to $R_1$. Alternatively $R_1$ and $R_2$ may also join together to form a six-membered morpholino group.

$R_3$ in the above formula is a group represented by the alkylenoxy radical Z, wherein A and x are as defined with respect to $R_1$; and Y is the anion, $R'SO_3$, wherein R' is a $C_1$–$C_{18}$alkyl, preferably a $C_1$–$C_2$ alkyl, e.g. Methyl and ethyl or a $C_8$–$C_{18}$ alkylphenyl, preferably a $C_{10}$–$C_{13}$ alkylphenyl. Preferably, the alkyl phenyl is a para-alkylphenyl.

With respect to R, $R_1$, and $R'_1$ the term alkyl denotes a univalent, essentially saturated branched or straight chained alkyl group. Representative of such alkyl groups include methyl, ethyl, propyl, butyl, pentyl, hexyl, isohexyl, heptyl, octyl, nonyl, decyl, undecyl, dodecyl, tridecyl, tetradecyl, pentadecyl, hexadecyl, heptadecyl, octadecyl, soya, eicosyl and the like. When derived from naturally occurring materials, the group R, $R_1$, and R' may contain a small amount of unsaturation and may be comprised of a mixture of alkyl groups. For example, commercially available dodecyl benzene sulfonic acid is a benzene sulfonic acid in which the alkyl substituent on the benzene ring is a mixture of $C_{10}$–$C_{13}$ alkyl groups, the nominal number of carbon atoms being about 12.

It has been found that masterbatches containing about 1.6 to about 10 weight percent of the antistatic compound can be readily prepared in the polyesters using any conventional blending equipment such as single screw extruders, twin screw extruders, Brabender Plastographs, Sigma blade mixers, and the like. Although masterbatches can be made with concentrations of antistatic agent greater than 10 percent such blends do not feed well during processing when they are let down in additional polyester material. Preferred concentrations include about 3 to about 7 weight percent. These masterbatches are generally prepared at melt temperatures of about 200 to about 250° C. The masterbatches can be let down in additional polyester in the same types of equipment described above at temperatures of about 150 to about 270° C. Generally, it is desirable to use as low a processing temperature as possible since degradation of these antistat additives and a corresponding yellow tinted discoloration of the extrudate may be discernible at temperatures of about 250° C. and above. Single screw extrusion is the most common processing equipment used to produce film, sheet, and molded artides. The single screw extrusion process involves a conventional single screw extrusion process having a feed zone, a compression zone, a metering zone, and a zone in which material is passed to a die. If single screw extrusion is to be used, then the temperatures in all zones are maintained in the conventional range of about 392° F. to about 572° F., except for the temperature in the feeding zone. In the feeding zone it has been found essential to maintain the temperature at no greater than 385° F. in order that the antistat-containing polymer composition or masterbatch may be processed. Preferably the temperature of the feed zone should be maintained within a range of about 200° F. to no greater than 385° F.; more preferably the temperature should be maintained within a range of about 300° F. to about 365° F.; and still more preferably within a range of about 340° F. to about 365° F. Other extrusion processes such as twin screw extrusion may also be used to produce film, sheet, and molded articles from the masterbatches.

Although not required, additives normally used in copolyesters may be used if desired. Such additives include colorants, dyes, pigments, fillers, antioxidants, stabilizers, flame retardants, impact modifiers, buffers and the like.

For the purposes of this invention, a masterbatch is as defined by one of ordinary skill in the art. More particularly, a masterbatch is a composition comprising a polymer and an antistatic agent where the antistat agent concentration is higher than desired in the final product, and which composition s subsequently let down in the same or other polymer to produce a final product with the desired concentration of antistatic agent.

The copolyester compositions of this invention are useful in applications where antistatic properties are required. The compositions are useful as monolayer film, monolayer sheet, as a layer(s) in multilayer film or multilayer sheet, and thermoformed articles produced from film or sheet such as clamshell packaging.

All percentages expressed herein refer to weight percentages unless otherwise specified.

This invention can be further illustrated by the following examples of preferred embodiments thereof, although it will be understood that these examples are included merely for purposes of illustration and are not intended to limit the scope of the invention unless otherwise specifically indicated.

EXAMPLES

In the examples, the following is to be noted.

Larostat HTS 905A antistat is a quatemary ammonium sulfonate salt, sold under the registered trademark of BASF Corporation.

Eastar PETG 6763 is a copolyester based on terephthalic acid, ethylene glycol, and 1,4-cyclohexanedimethanol, produced and sold by Eastman Chemical Company.

Eastapak Copolyester 9921 is a copolyester based on terephthalic acid, ethylene glycol, and 1,4-cyclohexanedimethanol, produced and sold by Eastman Chemical Company.

The copolyesters are PETG containing 100 mole percent terephthalic acid, and varying amounts of CHDM, with the balance of the 100 mole percent glycol being ethylene glycol.

Example 1

A masterbatch consisting of 4.7 weight percent Larostat HTS 905A antistat and 95.3 weight percent of a polyethylene terephthalate copolyester containing 31 mole percent CHDM was prepared using a 30-mm Werner & Pfleiderer twin screw extruder. The masterbatch was then mixed via pellet—pellet blending with Eastar PETG 6763 and subsequently extruded into 20-mil sheet using a 2.5 inch 24:1 MPM single screw extruder. The level of masterbatch used in the pellet blend and the extrusion conditions are given in Table 1.1. The results show that the extruder amps vary broadly between 26 and 50 percent and the extruder stopped feeding completely during 5/10 of the experiments. Thus, very inconsistent feeding during sheet extrusion is observed when the masterbatch was prepared using a polyethylene terephthalate copolyester containing 31 mole percent CHDM as the masterbatch resin.

TABLE 1.1

Extrusion of Larostat Antistat Masterbatch and Eastar PETG 6763

| | Extrusion Conditions | | | | | | | Master- | PETG 6763 | Extruder |
| --- | --- | --- | --- | --- | --- | --- | --- | --- | --- | --- |
| Sample | Z1 (° F.) | Z2 (° F.) | Z3 (° F.) | Z4 (° F.) | Z5 (° F.) | Die (° F.) | RPM | Batch (weight percent) | (weight percent) | Amps (percent) |
| 1 | 373 | 393 | 437 | 465 | 490 | 485 | 46 | 20 | 80 | Lost Feed |
| 2 | 338 | 425 | 447 | 460 | 474 | 474 | 30 | 10 | 90 | 50 |
| 3 | 337 | 426 | 442 | 451 | 465 | 468 | 50 | 20 | 80 | Lost Feed |
| 4 | 334 | 421 | 438 | 446 | 464 | 468 | 28 | 10 | 90 | 56–60 |
| 5 | 320 | 425 | 440 | 449 | 458 | 464 | 28 | 13.3 | 86.7 | 34–40 |
| 6 | 373 | 449 | 451 | 450 | 450 | 450 | 24 | 11.2 | 88.8 | 26 |
| 7 | 373 | 449 | 451 | 450 | 450 | 450 | 24 | 8.7 | 91.3 | Lost Feed |
| 8 | 373 | 449 | 451 | 450 | 450 | 450 | 24 | 8.7 | 91.3 | Lost Feed |
| 9 | 373 | 449 | 451 | 450 | 450 | 450 | 24 | 11.2 | 88.8 | Lost Feed |
| 10 | 373 | 449 | 451 | 450 | 450 | 450 | 24 | 11.2 | 88.8 | Lost Feed |

Z = zone

Example 2

Masterbatches consisting of Larostat HTS 905A antistat and hylene terephthalate copolyester containing 12 and 31 mole percent were prepared using a 30-mm Werner & Pfleiderer twin screw extruder. The compositions of the masterbatches are given in Table 2.1. The masterbatches were then mixed via pellet-pellet blending with Eastar PETG 6763 and subsequently extruded into 20-mil sheet using a 2.5-inch MPM 24:1 single screw extruder. The extrusion conditions for the sheet production were kept constant at Z1=400° F., Z2=480° F., Z3–Z5=490° F., die temperature=490° F., and 25 RPM where Z1–Z5 are the extruder zones. The level of masterbatch in the pellet blend and the resulting extrusion performance as indicated by the extruder amps are given in Table 2.2. Each sample in Table 2.2 represents the extrusion of 60 lbs. of pellet blend. The samples were produced in the order given in Table 2.2, which includes replicates. The results show that the extruder amps were consistently 30 to 37 amps during the 5 experiments conducted using the copolyester containing 12 mole percent CHDM as the masterbatch resin while the extruder lost feed completely each time the copolyester containing 31 mole percent CHDM was used as the masterbatch resin. Thus, feeding during sheet extrusion was improved by using the polyethylene terephthalate copolyester containing 12 mole percent CHDM as the masterbatch resin rather than the copolyester with 31 mole percent CHDM.

TABLE 2.1

Larostat Antistat Masterbatches

|  | Copolyester Composition | | Masterbatch Composition | |
| --- | --- | --- | --- | --- |
| Masterbatch Reference | EG (mole percent) | CHDM (mole percent) | Larostat Antistat (weight percent) | Copolyester (weight percent) |
| 1 | 69 | 31 | 4.7 | 95.3 |
| 2 | 88 | 12 | 8.2 | 91.8 |

EG = ethylene glycol

TABLE 2.2

Extrusion of Larostat Antistat Masterbatches and Eastar PETG 6763

| Sample | Masterbatch Reference | Masterbatch (weight percent) | Eastar PETG 6763 (weight percent) | Extruder Amps (percent) |
| --- | --- | --- | --- | --- |
| 1 | 2 | 13.5 | 86.5 | 34 |
| 2 | 2 | 13.5 | 86.5 | 30 |
| 3 | 2 | 13.5 | 86.5 | 37 |
| 4 | 2 | 13.5 | 86.5 | 30 |
| 5 | 1 | 22.2 | 77.8 | Lost Feed |
| 6 | 2 | 13.5 | 86.5 | 33 |
| 7 | 1 | 22.2 | 77.8 | Lost Feed |

Example 3

Masterbatches consisting of Larostat HTS 905A antistat and polyethylene terephthalate copolyester containing 12 and 31 mole percent CHDM were prepared using a 30-mm Werner & Pfleiderer twin screw extruder. The compositions of the masterbatches are given in Table 3.1. In addition, portions of selected masterbatches were crystallized at 140° C. for 1 hour. The masterbatches were then mixed via pellet—pellet blending with Eastar PETG 6763 and subsequently extruded into 20-mil sheet using a 2.5-inch 24:1 MPM single screw extruder. The extrusion conditions for the sheet production were kept constant using Z1=400° F., Z2=480° F., Z3–Z5=490° F., die temperature=490° F., and 27 RPM where Z1–Z5 are the extruder zones. The level of masterbatch in the pellet blend and the resulting extrusion performance as indicated by the extruder amps are given in Table 3.2. These samples were produced in the order given in Table 3.2, which includes replicates. A further summary of the results showing the average extruder amps and the fraction of experiments during which the extruder lost feed completely is provided in Table 3.3. The results show that when the masterbatch resin contained 12 mole percent CHDM (i.e. Masterbatch References 1 and 4) the average extruder amps were higher indicating better feeding and the extruder did not lose feed while lower amps and frequently lost feed were observed when the masterbatch resin contained 31 mole percent CHDM (i.e. Masterbatch References 2 and 3). Thus, feeding during sheet extrusion was improved by using the polyethylene terephthalate copolyester containing 12 mole percent CHDM as the masterbatch resin rather than the copolyester with 31 mole percent CHDM.

TABLE 3.1

Larostat Antistat Masterbatches

|  | Copolyester Composition | | Masterbatch Composition | |
| --- | --- | --- | --- | --- |
| Masterbatch Reference | EG (mole percent) | CHDM (mole percent) | Larostat Antistat (weight percent) | Copolyester (weight percent) |
| 1 | 88 | 12 | 5.48 | 94.52 |
| 2 | 69 | 31 | 4.64 | 95.36 |
| 3 | 69 | 31 | 9.56 | 90.44 |
| 4 | 88 | 12 | 11.51 | 88.49 |

EG = ethylene glycol

TABLE 3.2

Extrusion of Larostat Antistat Masterbatches and Eastar PETG 6763

| Sample | Masterbatch Reference | Masterbatch (weight percent) | Eastar PETG 6763 (weight percent) | Extruder Amps (percent) |
| --- | --- | --- | --- | --- |
| 1 | 2 | 10.78 | 89.22 | 20–28 |
| 2 | 4 | 9.12 | 90.88 | 42 |
| 3 | 1 | 9.12 | 90.88 | 42 |
| 4 | 2 | 10.78 | 89.22 | 20 |
| 5 | 3 | 5.23 | 94.77 | Lost Feed |
| 6 | 4 (crystallized) | 4.34 | 95.66 | 20–24 |
| 7 | 4 | 4.34 | 95.66 | 30–36 |
| 8 | 1 (crystallized) | 18.25 | 81.75 | 26–30 |
| 9 | 2 | 21.55 | 78.45 | 16–20, Lost Feed |
| 10 | 1 | 18.25 | 81.75 | 32–35 |
| 11 | 4 | 8.69 | 91.31 | 26 |
| 12 | 3 | 10.46 | 89.54 | 10–14, Lost Feed |
| 13 | 4 (crystallized) | 8.69 | 91.31 | 28–30 |

TABLE 3.3

Summary of Results

| Masterbatch Reference | Average Extruder Amps | Fraction of Experiments that Lost Feed |
| --- | --- | --- |
| 1 | 36 +/− 6 | 0/3 |
| 2 | 23 +/− 5 | 1/3 |
| 3 | 14 | 2/2 |
| 4 | 32 +/− 7 | 0/5 |

Example 4

Masterbatches consisting of Larostat HTS 905A antistat and polyethylene terephthalate copolyester containing various mole percent CHDM were prepared using a 30-mm Werner & Pfleiderer twin screw extruder. The compositions of these masterbatches are given in Table 4.1. in addition, portions of each masterbatch were subjected to additional thermal treatment in order to increase crystallization. The masterbatches were then mixed via pellet—pellet blending with either Eastar PETG 6763 or Eastapak Copolyester 9921 and subsequently extruded into 15-mil sheet using a 1-inch 24:1 Killion single screw extruder with a general purpose Maddock mixing screw. The extrusion conditions for sheet production were kept constant using Z1=200° C., Z2=220° C., Z3=245° C., die temperature=245° C., and 108 RPM during the Eastar PETG 6763 extrusion and Z1=240° C., Z2=250° C., Z3=270° C. die temperature=265° C., and 108 RPM during the Eastapak Copolyester 9921 extrusion. In order to generate a sheet sample for subsequent testing of antistatic properties, if feeding problems developed, then the extruder was force fed. Consequently, the extruder amps did not provide a good indication of the extrusion performance. Alternatively, the performance was simply noted by observation as either good, fair, or poor. The level of masterbatch in the pellet blend and the resulting extrusion performance are given in Table 4.2. In addition, a summary of the feeding during sheet extrusion is provided in Table 4.3. These results show that the masterbatches using polyethylene terephthalate copolyesters containing 3.5 and 12 mole percent CHDM as the masterbatch resin consistently fed good or fair during sheet extrusion while the masterbatches using copolyesters containing 31 and 62 mole percent CHDM often exhibited poor feeding during sheet extrusion. Thus, feeding during sheet extrusion was improved by using the polyethylene terephthalate copolyester containing less than 31 mole percent CHDM.

TABLE 4.1

Larostat Antistat Masterbatches

| Masterbatch Reference | Copolyester Composition | | Larostat Antistat (weight percent) | Copolyester (weight percent) |
|---|---|---|---|---|
| | EG (mole percent) | CHDM (mole percent) | | |
| 1 | 96.5 | 3.5 | 1.55 | 98.45 |
| 2 | 88 | 12 | 3.72 | 96.28 |
| 3 | 69 | 31 | 4.47 | 95.53 |
| 4 | 38 | 62 | 5.38 | 94.62 |
| 5 | 96.5 | 3.5 | 1.74 | 98.26 |
| 6 | 88 | 12 | 5.57 | 94.43 |
| 7 | 69 | 31 | 5.64 | 94.36 |
| 8 | 38 | 62 | 7.89 | 92.11 |
| 9 | 96.5 | 3.5 | 11.8 | 88.2 |

EG = ethylene glycol

TABLE 4.2

Extrusion of Larostat Masterbatches and Eastar PETG 6763

| Sample | Masterbatch Reference | Resin Reference | Masterbatch (weight percent) | Resin (weight percent) | Extrusion Feeding Observation | Extruder Amps (amps) |
|---|---|---|---|---|---|---|
| 1 | 2 | 6763* | 30 | 70 | Good | 6.0 |
| 2 | 1 | 6763* | 30 | 70 | Good | 4.0 |
| 3 | 8 | 6763* | 15 | 85 | Poor | 3.5 |
| 4 | 2X | 6763* | 30 | 70 | Good | 8.5 |
| 5 | 3 | 6763* | 30 | 70 | Poor | 3.5 |
| 6 | 7 | 6763* | 15 | 85 | Poor | 5.0 |
| 7 | 4 | 6763* | 30 | 70 | Poor | 5.0 |
| 8 | 2 | 9921** | 30 | 70 | Fair | 7.0 |

TABLE 4.2-continued

Extrusion of Larostat Masterbatches and Eastar PETG 6763

| Sample | Masterbatch Reference | Resin Reference | Masterbatch (weight percent) | Resin (weight percent) | Extrusion Feeding Observation | Extruder Amps (amps) |
|---|---|---|---|---|---|---|
| 9 | 5X | 9921** | 15 | 85 | Good | 5.0 |
| 10 | 4 | 9921** | 30 | 70 | Poor | 3.0 |
| 11 | 8 | 9921** | 15 | 85 | Poor | 2.0 |
| 12 | 8X | 9921** | 15 | 85 | Poor | 2.5 |
| 13 | 5 | 9921** | 15 | 85 | Good | 7.0 |
| 14 | 1 | 9921** | 30 | 70 | Good | 7.0 |
| 15 | 1X | 6763* | 30 | 70 | Good | 8.0 |
| 16 | 5 | 6763* | 15 | 85 | Good | 5.0 |
| 17 | 5X | 6763* | 15 | 85 | Good | 7.0 |
| 18 | 6 | 6763* | 15 | 85 | Good | 5.0 |
| 19 | 8X | 6763* | 15 | 85 | Poor | 3.5 |
| 20 | 6X | 6763* | 15 | 85 | Fair | 6.0 |
| 21 | 4X | 6763* | 30 | 70 | Poor | 5.0 |
| 22 | 2 | 6763* | 30 | 70 | Fair | 6.0 |
| 23 | 1 | 6763* | 30 | 70 | Good | 9.0 |
| 24 | 1X | 6763* | 30 | 70 | Good | 7.0 |
| 25 | 2X | 6763* | 30 | 70 | Fair | 7.0 |
| 26 | 2 | 6763* | 30 | 70 | Good | 5.0 |
| 27 | 1X | 9921** | 30 | 70 | Good | 7.0 |
| 28 | 2X | 9921** | 30 | 70 | Good | 6.0 |
| 29 | 3 | 9921** | 30 | 70 | Good | 4.0 |
| 30 | 6 | 9921** | 15 | 85 | Good | 3.0 |
| 31 | 4X | 9921** | 30 | 70 | Good | 3.0 |
| 32 | 7 | 9921** | 15 | 85 | Good | 4.0 |
| 33 | 6X | 9921** | 15 | 85 | Good | 5.0 |
| 34 | 9 | 6763* | 12.5 | 87.5 | Good | 3–4 |

*6763 = Eastar PETG 6763
**9921 = Eastapak PETG 9921
***X = the use of a masterbatch that has been crystallized

TABLE 4.3

Summary of Results

| Mole percent CHDM in Masterbatch Resin | Observed Feeding Characteristics during Sheet Extrusion | | |
|---|---|---|---|
| | Good (percent) | Fair (percent) | Poor (percent) |
| 3.5 | 100 | 0 | 0 |
| 12 | 64 | 36 | 0 |
| 31 | 50 | 0 | 50 |
| 62 | 12.5 | 0 | 87.5 |

Example 5

Masterbatches consisting of 5.5 and 11.5 weight percent Larostat HTS 905A antistat using a polyethylene terephthalate copolyester containing 12 mole percent CHDM were prepared using a 30-mm Werner & Pfleiderer twin screw extruder. The masterbatches were then mixed via pellet—pellet blending with Eastar PETG 6763 and subsequently extruded into 15-mil sheet using a 1-inch 24:1 Killion single screw extruder. The level of masterbatch in the pellet blend, the extrusion conditions, and the resulting extrusion performance as indicated by high extruder amps are given in Table 5.1. During these experiments, the amount of masterbatch used was chosen in order to obtain similar levels of Larostat antistat in the final sheet. The results show that the average amps observed during sheet extrusion when the masterbatch contained 5.5 weight percent Larostat antistat was 11.6+/−3.0 while the average amps observed when the masterbatch contained 11.5 weight percent Larostat antistat was only 5.3+/−2.0. Thus consistently better feeding during sheet extrusion as indicated by higher average extruder amps was observed when the masterbatch contained 5.5 weight percent Larostat 905A antistat compared to when the masterbatch contained 11.5 weight percent Larostat 905A antistat even though the percentage of masterbatch extruded was much lower.

TABLE 5.1

Extrusion of Larostat Antistat Masterbatches and Eastar PETG 6763

| Sample | Larostat Antistat in Masterbatch (wt. percent) | Masterbatch (wt. percent) | PETG (wt. percent) | Extrusion Conditions | | | | | |
|---|---|---|---|---|---|---|---|---|---|
| | | | | Z1 (° C.) | Z2 (° C.) | Z3 (° C.) | Die (° C.) | RPM | Extruder Amps |
| 0 | NA | 0 | 100 | 190 | 216 | 240 | 242 | 85 | 7.5 |
| 1 | 5.5 | 10 | 90 | 190 | 216 | 240 | 245 | 85 | 5.5 |
| 2 | 5.5 | 20 | 80 | 190 | 216 | 240 | 242 | 85 | 12.0 |
| 3 | 11.5 | 10 | 90 | 185 | 205 | 235 | 242 | 85 | 5.0 |
| 4 | 11.5 | 15 | 85 | 190 | 204 | 235 | 242 | 85 | 4.0 |
| 5 | 5.5 | 30 | 70 | 190 | 215 | 235 | 242 | 60 | 13.0 |
| 6 | 11.5 | 5 | 95 | 190 | 205 | 235 | 242 | 85 | 8.0 |
| 7 | 11.5 | 5 | 95 | 190 | 205 | 235 | 242 | 85 | 7.5 |
| 8 | 5.5 | 20 | 80 | 190 | 220 | 235 | 242 | 85 | 13.5 |
| 9 | 11.5 | 10 | 90 | 185 | 205 | 235 | 242 | 85 | 4.5 |
| 10 | 11.5 | 15 | 85 | 185 | 205 | 235 | 242 | 110 | 3.0 |
| 11 | 5.5 | 30 | 70 | 190 | 210 | 235 | 242 | 85 | 10.0 |
| 12 | 5.5 | 10 | 90 | 200 | 220 | 240 | 242 | 85 | 14.5 |

Z = zone

The invention has been described in detail with particular reference to preferred embodiments thereof, but it will be understood that variations and modifications can be effected within the spirit and scope of the invention. Moreover, all patents, patent applications, provisional patent applications, and literature references cited above are incorporated herein by reference for any disclosure pertinent to the practice of this invention.

We claim:

1. A copolyester composition which comprises:
   a. a copolyester comprising
      (1) from about 80 mole percent to about 100 mole percent of an acid selected from the group consisting of terephthalic acid, naphthalenedicarboxylic acid, 1,4-cyclohexanedicarboxylic acid, and mixtures thereof, and, from about 0 to about 20 mole percent of one or more modifying acids, and
      (2) from about 80 mole percent to about 99 mole percent ethylene glycol, and from about 1 mole percent to about 20 mole percent of one or more modifying diols, and
   b. a quaternary ammonium salt having thermal stability at a temperature greater than 200° C. wherein the quaternary ammonium salt is present in an amount ranging from greater than about 1.6 to about 10 percent by weight based on the total composition.

2. The copolyester composition of claim 1 comprising a masterbatch.

3. The copolyester composition according to claim 1 wherein the quaternary ammonium salt is a quaternary ammonium alkyl benzene sulfonate salt.

4. The copolyester composition according to claim 1 wherein the quaternary ammonium salt is a quaternary ammonium alkane sulfonate salt.

5. The copolyester composition according to claim 1 wherein the quaternary ammonium salt is octyl dimethyl hydroxyethyl ammonium dodecylbenzene sulfonate.

6. The copolyester composition according to claim 1 wherein the quaternary ammonium salt is octyl dimethyl hydroxyethyl ammonium methane sulfonate.

7. The copolyester composition according to claim 1 wherein the quaternary ammonium salt is selected from compounds represented by the following formula:

$$R-\underset{\underset{R_2}{|}}{\overset{\overset{R_1}{|}}{N^+}}-R_3 \quad R'SO_3^-$$

wherein R is a $C_2$–$C_{22}$ alkyl, $R_1$ is selected from the group consisting of $C_1$–$C_{22}$ alkyl and an alkyleneoxy radical $\{-CH_2-C(A)H-O\}_xH$, $R_2$ is selected from the group consisting of $C_1$–$C_3$ alkyl and the radical $\{-CH_2-C(A)H-O\}_xH$ or $R_2$ may join together with $R_1$ to form a morpholino group, $R_3$ is a radical $\{-CH_2-C(A)H-O\}_xH$, R' is selected from the group consisting of $C_1$–$C_{18}$ alkyl and $C_8$–$C_{18}$ alkylphenyl, wherein A is selected from hydrogen, methyl and ethyl, and x is 1.

8. The copolyester composition according to claim 1 wherein the quaternary ammonium salt having thermal stability at a temperature greater than 200° C. is present in an amount ranging from about 3 to about 7 weight percent.

9. The copolyester composition according to claim 1 wherein said one or more modifying diols are selected from the group consisting of neopentyl glycol, 1,4-yclohexanedimethanol, 1,2-propanediol, 1,3-propanediol, 1,4-butanediol, 1,6hexanediol, 1,2-cyclohexanediol, 1,4-cyclohexanediol, 1,2-cyclohexanedimethanol, 1,3-cyclohexanedimethanol, Z,8-bis(hydroxymethyl)-tricyclo-[5.2.1.0]-decane wherein Z represents 3, 4, or 5; and diols containing one or more oxygen atoms in the chain, e.g. diethylene glycol, triethylene glycol, dipropylene glycol, and tripropylene glycol.

10. The copolyester composition of claim 9 wherein said modifying diol is 1,4-cyclohexanedimethanol.

11. The copolyester composition according to claim 9 wherein said modifying diol is present at from about 1–15 mole %.

12. The copolyester composition according to claim 11 wherein said modifying diol is present at from about 5–15 mole %.

13. The copolyester composition according to claim 12 wherein said 1,4-modifying diol is present at from about 10–14 mole %.

14. The copolyester composition according to claim 1 wherein said modifying acid is independently selected from isophthalic acid, 1,3-cyclohexanedicarboxylic acid, succinic acid, glutaric acid, adipic acid, sebacic acid, suberic acid, and 1,12-dodecanedioic acid.

15. The copolyester composition according to claim 1 wherein said copolyester comprises about 100 mole percent terephthalic acid, about 80 to about 99 mole percent ethylene glycol, and about 1 to about 20 mole percent 1,4-cyclohexanedimethanol.

16. The copolyester composition according to claim 15 wherein said copolyester comprises about 100 mole percent terephthalic acid, about 80 to about 90 mole percent ethylene glycol, and about 10 to about 20 mole percent 1,4-cyclohexanedimethanol.

17. The copolyester composition according to claim 1 wherein said copolyester comprises one or more branching agents selected from the group consisting of trimellitic acid, pyromellitic dianhydride, trimethylolpropane, and pentaerythritol.

18. The copolyester composition according to claim 1 wherein said copolyester has an inherent viscosity of about 0.5 to about 1.5 dl/g as determined in a 60/40 (wt/wt) phenol/tetrachloroethane solution at a concentration of 0.5 grams per 100 ml at 25° C.

19. The copolyester composition according to claim 18 wherein said copolyester has an inherent viscosity of about 0.6 to about 1.0 dl/g as determined in a 60/40 (wt/wt) phenol/tetrachloroethane solution at a concentration of 0.5 grams per 100 ml at 25° C.

20. The process of making a copolyester composition according to claim 1 comprising mixing or blending said quaternary ammonium salt with said copolyester.

* * * * *

UNITED STATES PATENT AND TRADEMARK OFFICE
CERTIFICATE OF CORRECTION

PATENT NO.     : 6,271,291 B1
DATED          : August 7, 2001
INVENTOR(S)    : McWilliams et al.

It is certified that error appears in the above-identified patent and that said Letters Patent is hereby corrected as shown below:

Column 12,
Line 52, "yclohexanedimethanol," should read -- cyclohexanedimethanol, --.
Line 53, "1,6hexanediol," should read -- I,6-hexanediol, --.

Signed and Sealed this

Twenty-second Day of October, 2002

Attest:

Attesting Officer

JAMES E. ROGAN
Director of the United States Patent and Trademark Office